A. W. OLDS.
ELECTRIC SWITCH FOR OPERATING AUTOMOBILE SPEED SIGNALS.
APPLICATION FILED OCT. 9, 1920.
1,394,111.
Patented Oct. 18, 1921.
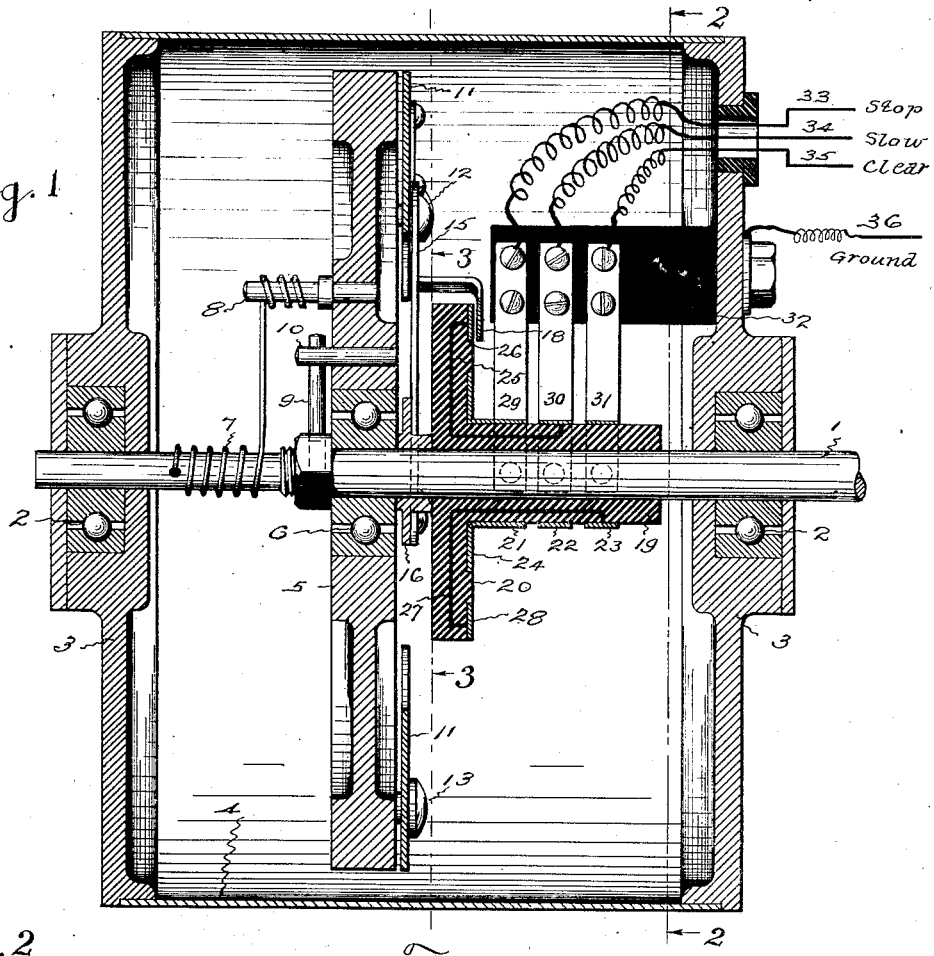
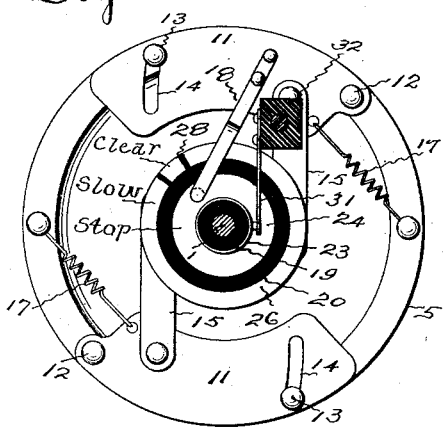
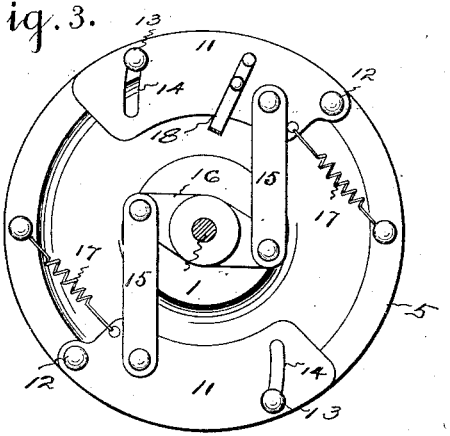
Inventor.
Alfred W. Olds by
Harry P. Williams
Attorney

UNITED STATES PATENT OFFICE.

ALFRED W. OLDS, OF WINDSOR, CONNECTICUT.

ELECTRIC SWITCH FOR OPERATING AUTOMOBILE SPEED-SIGNALS.

1,394,111.  Specification of Letters Patent.  Patented Oct. 18, 1921.

Application filed October 9, 1920. Serial No. 415,843.

*To all whom it may concern:*

Be it known that I, ALFRED W. OLDS, a citizen of the United States, residing at Windsor, in the county of Hartford and State of Connecticut, have invented a new and useful Improvement in Electric Switches for Operating Automobile Speed-Signals, of which the following is a specification.

This invention relates to an apparatus which is adapted to be placed on pleasure and commercial automobiles and other motor vehicles for automatically controlling a sign designed to indicate a change in the rate of travel of the vehicle.

The object of the invention is to provide a simple and effective apparatus which will make the necessary switches in electrical circuits, as the speed of the vehicle varies, to cause the sign which is connected with the electrical circuits, to indicate such changes in the movements of the vehicle as may occur.

In attaining this end a member is loosely mounted on a shaft, which is to be connected with and rotated by some moving part of the vehicle, so as to turn with the shaft under normal conditions but owing to its momentum run ahead of the shaft as the shaft slows down. On the rotatable member is a weight so hung that it will be thrown out by centrifugal action according to the speed of rotation. The weight has a finger which engages different electrical contacts that rotate at the same speed as the shaft, as the weight changes position due to the speed of its revolution, and closes the required circuits to cause the proper indications of the sign, such for instance as "Stop," "Slow," "Clear."

In the accompanying drawings Figure 1 shows a central, vertical section of an apparatus which embodies the invention. Fig. 2 shows on smaller scale a transverse section on the plane indicated by the dotted line 2—2 on Fig. 1, the casing being omitted. Fig. 3 is a similar view taken on the plane indicated by the line 3—3 on Fig. 1.

The shaft 1, which is designed to be connected with any suitable rotating part of the vehicle upon which the apparatus is mounted, is supported by anti-friction bearings 2 arranged in the heads 3 that are secured in the ends of the cylindrical shell 4. The rotatable weight carrying member is desirably made in the form of a flywheel 5 and is mounted on the shaft within the casing with interposed anti-friction bearings 6. A light spring 7 is connected with the shaft and with a stud 8 projecting from the rotatable member to retain said member with a yielding force in normal relation to the shaft, and a pin 9 is extended from the shaft so as to engage a stud 10 projecting from the member and provide a stop which will limit the independent movements relatively of member and shaft.

Pivotally attached to the rotatable member so that they may swing outward transversely of the shaft are one or more weights 11. These weights are shown as thin metal plates and it is preferred to provide two of these weights and secure them by pivots 12 and guide them by studs 13 that extend from the member through slots 14 in the weights. If two weights are used they are desirably connected by links 15 with a common rocker 16 that is loosely mounted on the shaft, so that the weights will operate together. Springs 17 connected between the rotatable member and weights normally draw the weights inward. Attached to one of the weights and projecting inwardly is an electrically conducting finger 18.

Secured on the shaft is an insulating sleeve 19 with an insulating flange 20. On the sleeve are three conducting bands 21, 22 and 23. The band 21 on the sleeve is electrically connected with a contact ring 24 set in the face of the flange, the band 22 is connected by a wire 25 with a contact ring 26 set in the face of the flange, and the band 23 is connected by a wire 27 with a small contact plate 28 set in the face of the insulating flange between and insulated from the ends of the ring 26.

A brush 29 is arranged to engage the band 21, a brush 30 is arranged to engage the band 22, and a brush 31 is in contact with the band 23. These brushes are mounted on an insulating block 32 that is fastened to one of the heads, and connected with them are suitable conductors 33, 34, 35 which lead to the warning sign. A battery ground wire 36 is connected to one of the heads of the casing.

The finger which is attached to one of the weights is so shaped and directed that in the various positions of the weight it will engage with the ring 24 or the ring 26 or the plate 28. When the parts are at rest in normal position the finger lies against the ring 24 so an electrical circuit is completed through the apparatus and ground and the brush 29 and lead wire 33, under which condition the sign may indicate "stop". When the machine is running normally at uniform speed and the rotatable weight carrying member is rotating with the shaft the weights are thrown out and this carries the finger against the plate 28. This closes a circuit through the apparatus and ground and through the plate 28, wire 27, band 23, brush 31 and lead wire 35, which circuit may cause the sign to indicate "clear" or any other suitable announcement. When the machine slows down after traveling at uniform speed and the weight carrying member runs ahead of the shaft, the finger is carried into contact with the ring 26 and a circuit is then established through the apparatus and ground and the ring 26, wire 25, band 22, brush 30 and lead wire 34, which circuit can cause the sign to indicate "slow".

The invention claimed is:—

1. An electric signal switch comprising a rotary shaft, a member loosely mounted on the shaft, a conductor loosely mounted on said member and adapted under centrifugal action to assume different positions radially of the shaft according to the speed of rotation of the member, contacts rotatable with the shaft and adapted to be engaged by said conductor, and brushes in engagement with said contacts.

2. An electric signal switch comprising a rotary shaft, a member loosely mounted on the shaft, a weight pivotally attached to said member, a finger attached to and movable with the weight, contacts rotatable with the shaft and adapted to be engaged by said finger, and brushes in engagement with said contacts.

3. An electric signal switch comprising a rotary shaft, a member loosely mounted on the shaft, a pair of weights pivotally attached to said member, means connecting the weights so that they move coincidently, a finger attached to and movable with the weights, contacts rotatable with the shaft and adapted to be engaged by said finger, and brushes in engagement with said contacts.

4. An electric signal switch comprising a rotary shaft, a member loosely mounted on the shaft, a spring yieldingly connecting said member with the shaft, a weight pivotally attached to the member, a finger attached to and movable with the weight, contacts rotatable with the shaft and adapted to be engaged by said finger, and brushes in engagement with said contacts.

5. An electric signal switch comprising a rotary shaft, a member loosely mounted on the shaft, a weight pivotally attached to said member, a finger attached to and movable with the weight, conducting rings mounted on and insulated from the shaft and adapted to be engaged by said finger, conducting bands mounted on and insulated from the shaft, conductors connecting said rings and bands, and brushes in engagement with said bands.

6. An electric signal switch comprising a rotary shaft, a member loosely mounted on the shaft, a spring yieldingly connecting the said member and the shaft, a pair of weights pivotally attached to the member, links and a rocker connecting the weights so that they move coincidently, springs normally drawing the weights inward, a finger attached to and movable with one of the weights, contacts rotatable with the shaft and adapted to be engaged by said finger, and brushes in engagement with said contacts.

7. An electric signal switch comprising a rotary shaft, a member loosely mounted on the shaft, a weight pivotally attached to said member, a finger attached to and movable with the weight, contacts annularly arranged on the shaft at different distances from the axis and adapted to be engaged by the finger, conductors mounted on and rotating with the shaft, means connecting said contacts and said conductors, and brushes in engagement with said contacts.

ALFRED W. OLDS.